July 29, 1947.  R. A. GOEPFRICH  2,424,655

BRAKE ADJUSTOR

Filed May 24, 1944

INVENTOR
BY RUDOLPH A. GOEPFRICH
T.J. Plante
ATTORNEY

Patented July 29, 1947

2,424,655

UNITED STATES PATENT OFFICE 2,424,655

BRAKE ADJUSTOR

Rudolph A. Goepfrich, South Bend, Ind., assignor to Bendix Aviation Corporation, South Bend, Ind., a corporation of Delaware Application May 24, 1944, Serial No. 537,045

3 Claims. (Cl. 188—79.5)

This invention relates to brake adjustors adapted to change the released position of the brake shoes to compensate for shoe lining wear.

An object of the invention is to provide adjustment mechanism which will be easily accessible for the mechanic.

A further object of the invention is to provide a simplified and inexpensive adjusting mechanism which will have the advantage mentioned in the preceding paragraph.

Other objects and advantages of the present invention will become apparent during the course of the following description, reference being had therein to the accompanying drawing, in which.

Figure 1:
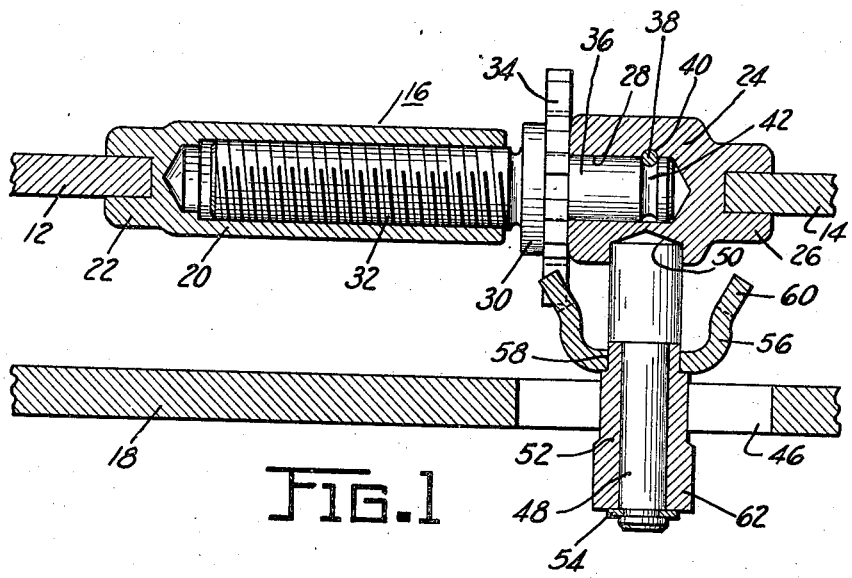
Figure 1 is a horizontal section taken through the adjusting mechanism of a brake assembly.
Figures 2, 3:
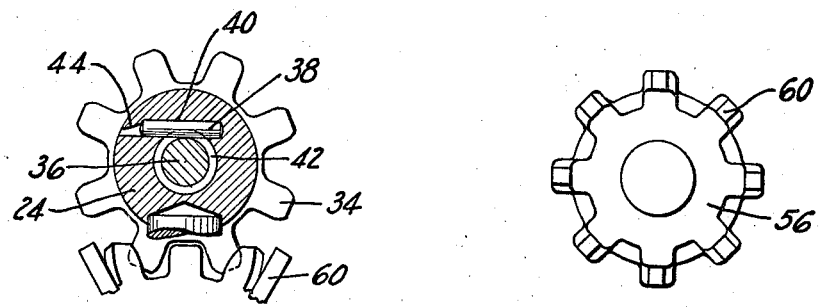
Figure 2 is a section taken on the line 2—2 of Figure 1.
Figure 3 is an end view of one of the gears of the adjusting mechanism.

Although not necessarily limited to such use, the adjusting mechanism which embodies my invention is particularly applicable to brakes of the "servo" type, wherein two brake shoes are connected at one end by a floating adjustable strut, and are applied and anchored at the opposite end, one of the shoes acting as a "servo" shoe to apply the other. Depending upon the direction of rotation of the brake drum, each shoe may either serve as the "servo" shoe, or as the anchor shoe.

Referring to the drawings, the unanchored ends of a pair of shoes 12 and 14 are shown, connected as usual by a floating adjustable link, indicated generally at 16. The shoes 12 and 14 are mounted on the backing plate 18 in the conventional manner.

The adjustable length floating strut may comprise an internally threaded sleeve member 20 prevented from rotation relative to shoe 12 by means of extensions 22 embracing the shoe web; a non-rotatable strut 24 having extensions 26 embracing the web of shoe 14 and having a bore 28 in its opposite end; and a screw member 30 having a stem 32 screwed into the sleeve 20 and a toothed head 34 bearing against the end of non-rotatable strut 24, an extension 36 on screw member 30 being guided in bore 28 of the member 24.

The toothed head 34 may conveniently be formed separately from the rest of screw member 30, and be secured thereto by suitable means, such as hydrogen brazing. Said toothed head or star wheel 34 may conveniently be a stamping. The sleeve 20, the body portion of screw member 30 including both the threaded stem 32 and the integral extension 36, and the strut 24, may all be formed as screw machine parts.

In order that the entire adjustable strut, including the parts 20, 24 and 30, may be formed as a subassembly and held in assembled relation, a pin 38 located in a slot 40 formed in member 24, may have a portion extending into a groove 42 in the outer cylindrical surface of extension 36, thereby retaining member 24 in assembled relationship with the rest of the adjusting device. In assembling the parts, member 24 is slipped over the end of extension 36, whereupon the pin 38 is inserted in slot 40, and the portion 44 of member 24 is bent inwardly to lock pin 38 in position.

In order that adjustment of the length of floating strut 16 may be accomplished by operating an easily accessible member, and in order that the various parts of the adjusting mechanism may be manufactured relatively inexpensively, I have provided a control for the adjustable strut 16 which is mounted thereon and which floats therewith, and which at the same time is accessible outside the backing plate. To this end, a relatively long slot 46 is cut in the backing plate 18, and through this slot extends a shaft 48 which is mounted on and which is secured to the member 24 of the floating adjusting strut by any suitable means, such as hydrogen brazing. For this purpose an opening 50 is preferably drilled in one side of member 24. Mounted on shaft 48 is a sleeve 52, which is capable of rotating on the shaft. The sleeve may be held on the shaft by means of a C washer 54. A gear 56, which may be formed by stamping, is secured at 58 to sleeve 52 by suitable means, such as hydrogen brazing, and the toothed portion 60 of the gear is in mesh with the toothed head 34 on the screw member 30 of the adjusting strut. The outer end 62 of sleeve 52 is formed with a non-circular surface, as for example, a square or hexagonal surface, in order that an adjusting tool may be placed thereon to turn the sleeve 52.

Rotation of sleeve 52 causes the teeth of gear 56 to rotate the head 34 of the adjusting screw. This, of course, turns the stem 32 of the adjusting screw relative to sleeve 20, thereby moving the stem 32 either in or out of the sleeve to adjust the length of the floating adjusting strut 16, and determine the released position of the brake shoes with respect to the brake drum.

Because the shaft 48 which supports gear 56 is carried by the member 24 of the floating adjusting strut, and gear 34 is always held against the left end of member 24 by a spring (not shown) between the two shoes and adjacent the adjustable strut 16, there is no possibility of gears 56 and 34 getting out of mesh due to relative movement thereof. In adjusting means heretofore provided where a gear carrying member extended through the backing plate to be easily accessible, that member was pivoted on the backing plate, and in order to insure that the gears would be in contact at all positions of the floating adjusting strut, it was necessary to make the toothed head 34 of the adjusting screw extremely wide or deep, or, in the alternative, to do the same with the gear supported on the backing plate. Where one or both of the gears heretofore had to be made by forging or other more expensive methods, due to the required width of the teeth, the gears 56 and 34 of the device disclosed herein may be produced by the less expensive and more satisfactory stamping method.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. For use in a brake assembly having two brake shoes each provided with a strengthening web and a cover member located at one side of the brake shoes; a bodily movable adjustor mounted between the ends of the shoes comprising a first non-rotatable member including an internally threaded sleeve and a slotted end portion embracing the end of the web of one of the shoes, a second non-rotatable member including a sleeve having a cylindrical bore and a slotted end portion embracing the end of the web of the other shoe, a rotatable member including an externally threaded stem screwed into the sleeve of the first non-rotating member and an oppositely projecting cylindrical extension supported in the bore of the second non-rotatable member, said rotatable member having an annular flange which rests against one end of the second non-rotatable member and which has gear teeth formed on its periphery, a laterally extending fixed shaft member secured to the second non-rotating member, and a manually operable member rotatably supported on said shaft and having a gear associated therewith which meshes with the toothed portion of the rotatable member, said manually operable member extending through an opening in the aforementioned cover member.

2. For use in a brake assembly having two brake shoes each provided with a strengthening web and a cover member located at one side of the brake shoes; a bodily movable adjustor mounted between the ends of the shoes comprising a first non-rotatable member including an internally threaded sleeve and a slotted end portion embracing the end of the web of one of the shoes, a second non-rotatable member including a sleeve having a cylindrical bore and a slotted end portion embracing the end of the web of the other shoe, a rotatable member including an externally threaded stem screwed into the sleeve of the first non-rotating member and an oppositely projecting cylindrical extension supported in the bore of the second non-rotatable member, said rotatable member having an annular flange which rests against one end of the second non-rotatable member and which has gear teeth formed on its periphery, and a manually operable member rotatably supported by the second non-rotatable member and having a gear associated therewith which meshes with the toothed portion of the rotatable member, said manually operable member extending through an opening in the aforementioned cover member.

3. For use in a brake assembly having two brake shoes each provided with a strengthening web and a cover member located at one side of the brake shoes; a bodily movable adjustor mounted between the ends of the shoes comprising a first non-rotatable member including an internally threaded sleeve and a slotted end portion embracing the end of the web of one of the shoes, a second non-rotatable member including a sleeve having a cylindrical bore and a slotted end portion embracing the end of the web of the other shoe, a rotatable member including an externally threaded stem screwed into the sleeve of the first non-rotating member and an oppositely projecting cylindrical extension supported in the bore of the second non-rotatable member, said rotatable member having an annular flange which has gear teeth formed on its periphery, and a manually operable member rotatably supported by the second non-rotatable member and having a gear associated therewith which meshes with the toothed portion of the rotatable member, said manually operable member extending through an opening in the aforementioned cover member.

RUDOLPH A. GOEPFRICH.

REFERENCES CITED

The following references are of record in the file of this patent:

UNITED STATES PATENTS

| Number | Name | Date |
|---|---|---|
| 2,134,564 | Lauer | Oct. 25, 1938 |
| 2,366,946 | Whitacre | Jan. 9, 1945 |
| 1,865,524 | LaBrie | July 5, 1932 |